US007288308B2

(12) United States Patent
Graab et al.

(10) Patent No.: US 7,288,308 B2
(45) Date of Patent: Oct. 30, 2007

(54) FLOOR COVERING OF AN ELASTOMER MATERIAL HAVING A TEXTURED SURFACE

(75) Inventors: Gerhard Graab, Mannheim (DE); Alfons Butscher, Birkenau (DE); Peter Spissinger, Moerlenbach (DE)

(73) Assignee: Carl Freudenberg KG, Weinheim (DE)

( * ) Notice: Subject to any disclaimer, the term of this patent is extended or adjusted under 35 U.S.C. 154(b) by 546 days.

(21) Appl. No.: 10/840,155

(22) Filed: May 6, 2004

(65) Prior Publication Data

US 2004/0226244 A1 Nov. 18, 2004

(30) Foreign Application Priority Data

May 8, 2003 (DE) ................................ 103 20 811

(51) Int. Cl.

*B32B 3/00* (2006.01)
*E04F 15/00* (2006.01)
*A47G 9/06* (2006.01)

(52) U.S. Cl. .......................... 428/156; 428/78; 428/79; 52/177; 52/180; 5/417

(58) Field of Classification Search ............ 428/77-79, 428/156; 5/417; 52/177, 403.1, 180; 15/215

See application file for complete search history.

(56) References Cited

U.S. PATENT DOCUMENTS

| | | | | |
|---|---|---|---|---|
| 2,871,152 | A * | 1/1959 | Tobin | 428/29 |
| 6,939,598 | B2 | 9/2005 | Heckel et al. | 428/156 |
| 2002/0037394 | A1 | 3/2002 | Heckel et al. | 428/156 |

FOREIGN PATENT DOCUMENTS

| | | |
|---|---|---|
| AT | 000 146 U1 | 3/1995 |
| DE | 1 018 209 | 10/1957 |
| DE | 1 683 381 | 3/1971 |
| DE | 10039118 | 3/2002 |
| EP | 0399959 | 11/1990 |
| EP | 1 184 528 | 3/2002 |
| EP | 0 814 218 | 5/2002 |
| FR | 1 542 948 | 10/1968 |
| JP | A-03-8967 | 1/1991 |
| JP | A-06-149142 | 5/1994 |
| JP | 2001159228 | 6/2001 |

* cited by examiner

*Primary Examiner*—Donald J. Loney
(74) *Attorney, Agent, or Firm*—Davidson, Davidson & Kappel, LLC

(57) ABSTRACT

A floor covering of an elastomer material having a textured surface having a plurality of unevenly distributed reliefs, which partially overlap one another and are of a rectangular or square shape having rounded corners and extents of between 1.2 and 6 mm, the height of the reliefs being between 0.01 mm and 0.1 mm.

10 Claims, 2 Drawing Sheets

INTERSECTION A – B

FLOOR COVERING OF AN ELASTOMER MATERIAL HAVING A TEXTURED SURFACE

Priority is claimed to German Patent Application No. DE 103 20 811.9, filed on May 8, 2003, the entire disclosure of which is incorporated by reference herein.

Depending on the field of application, different materials, colorations, and textures are used for floor coverings. For those floor coverings which are subject to considerable wear, for example those used in public buildings, an elastomer material is used, which has a substantial abrasion resistance and maintains a pleasing appearance over a long period of time. The present invention is concerned with these types of floor coverings.

BACKGROUND

From the European Patent Application EP 0 399 959 A1, a floor covering of elastomer material is known, which is provided with bulged elevations. The height of the elevations is between 0.2 mm and 1.0 mm. They are arranged in groups and provided with reflecting or schimmering surfaces, so that, depending on one's angle of view of the floor, the floor has a different appearance. Although the floor covering itself is monochromatic, it takes on the desired effect of differentiated color hues due to the high-luster surfaces. Such floor coverings have the disadvantage of being difficult to clean and of exhibiting substantial resistance to rolling. The latter is perceived as particularly disadvantageous by passengers in airports, train stations, and the like, when they pull roller suitcases or roller bags over the floor covering.

The German Laid Open Print DE 100 39 118 A1 describes a floor covering of an elastomer material having a textured surface that is provided with unevenly distributed depressions of an elongated shape which are partially contiguous and/or intersect one another and have a depth of 0.02 mm to 0.2 mm, at a width of 0.2 mm to 2.5 mm, and a length of 5 mm to 50 mm. Such floor coverings are supposed to have a good durability, be easy to clean, have a lowest possible resistance to rolling, and be wear-resistant.

SUMMARY OF THE INVENTION

An object of the present invention is to provide a floor covering which will enhance pedestrian safety by avoiding reflections, and which will help prevent abrasive wear or subsurface unevenness from becoming apparent on the surface of the covering.

The present invention provides a floor covering of an elastomer material having a textured surface, which, on its surface, has flat elevations that are nested in one another and overlap one another, the elevations being of a rectangular or square shape having rounded corners and extents (edge lengths) of between 1.2 and 6 mm, the height of the elevations (H) being between 0.01 mm and 0.1 mm. The surface structure of the covering is completely nondirectional and of a refractive nature.

A floor covering of this kind virtually retains the good properties of a flat floor covering, which are manifested in a very low resistance to rolling and a good fastness to cleaning. At the same time, it has an improved appearance, in that it is optically pleasing, and also in that undesired, insignificant amounts of abrasive wear do not become evident. The height of the elevations is so low that visible soiling is diminished. The selected shape of the elevations and their arrangement on the surface result in an appearance which is also optically very pleasing.

In a preferred formation, the elevations have edge lengths of between 1.3 to 3.6 mm, at a height H of between 0.02 and 0.05 mm.

The elevations in the floor covering are preferably applied in such a way that the floor covering is made up of individual, repeating surface area units.

From a standpoint of production engineering, it is beneficial when the floor covering is made of a single-layer material. Its thickness is selected from 2 mm to 5 mm, preferably from 2.5 mm to 4 mm.

An advantage of such a floor covering over known floor coverings is a decrease in the degree of luster, as defined by DIN 5036. When measurements are taken at an 85° angle of incidence, a floor covering having a smooth surface has a reflectance of approximately 96%, whereas the floor covering of the present invention has a reflectance of approximately 48%. As a result, because of the psychological effect, greater pedestrian safety is achieved for surfaces which are not lustrous. This is advantageous in applications where a high luster can make people feel uncertain when walking, because of sidelight entering through a window array. At the same time, unevenness of the subsurface is better concealed by the low-luster surface than it is by high-luster surfaces. The mentioned design has the advantage that dirty water is able to be removed more easily than it is from floor coverings having depressions.

BRIEF DESCRIPTION OF THE DRAWINGS

The present invention is explained in greater detail below on the basis of an exemplary embodiment and with reference to the drawings, in which.

DETAILED DESCRIPTION

Figure 1:
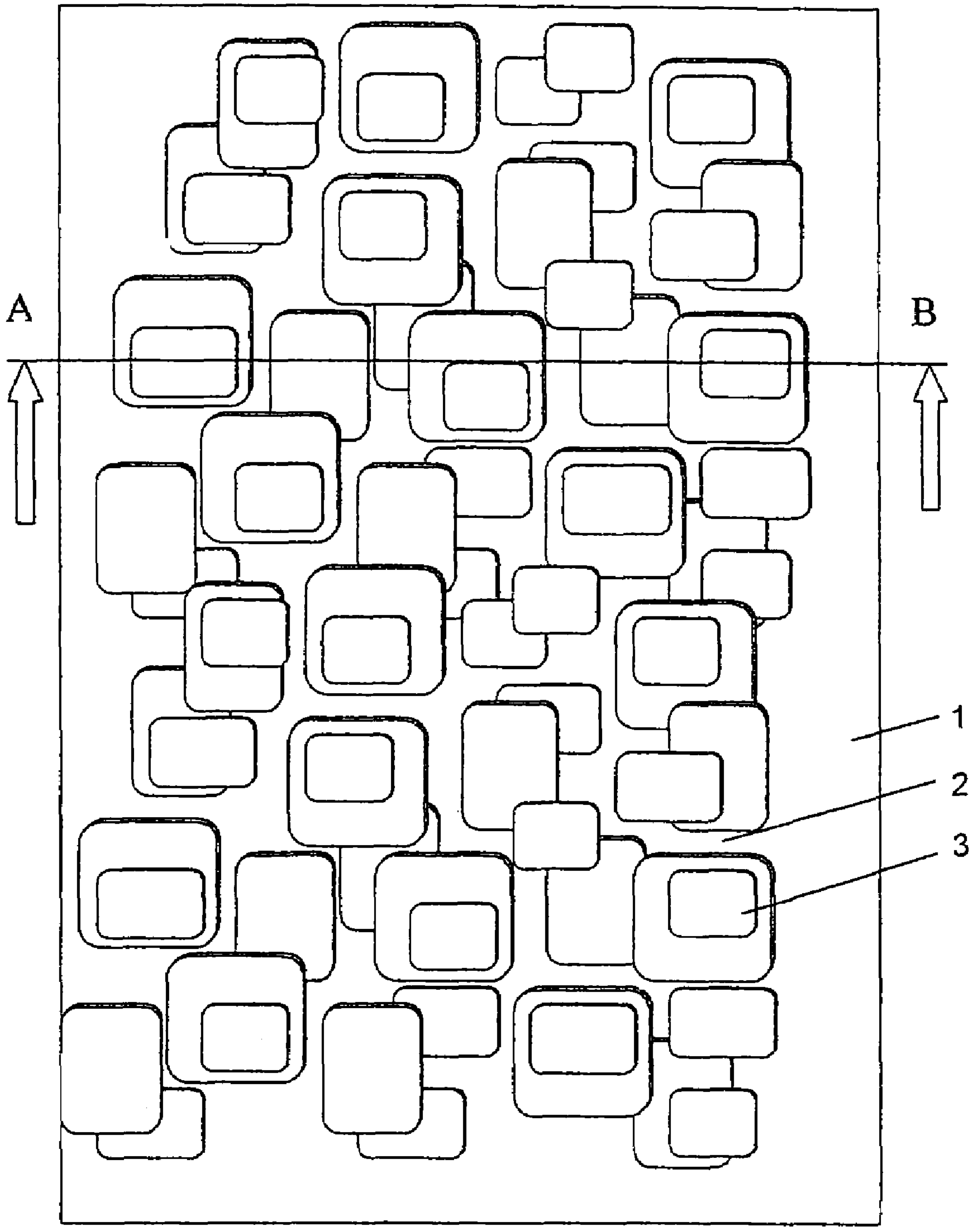
FIG. 1 shows a plan view of a detail of the floor covering.

In the plan view, FIG. 1 shows a detail of floor covering 1 of an elastomer material. Thickness S of floor covering 1 is 3 mm. Its surface 2 is provided with unevenly distributed elevations 3, approximately 18 large (3.6 mm edge length), 10 medium (approximately 2.1 mm edge length), and 18 small (1.2 mm edge length) squares being arranged over 4 $cm^2$. Alternatively, rectangles may also be used, whose length-to-width ratio is 5:1 at a maximum. Thus, a special case of such a rectangle is the square having a length-to-width ratio of 1:1.

Figure 2:
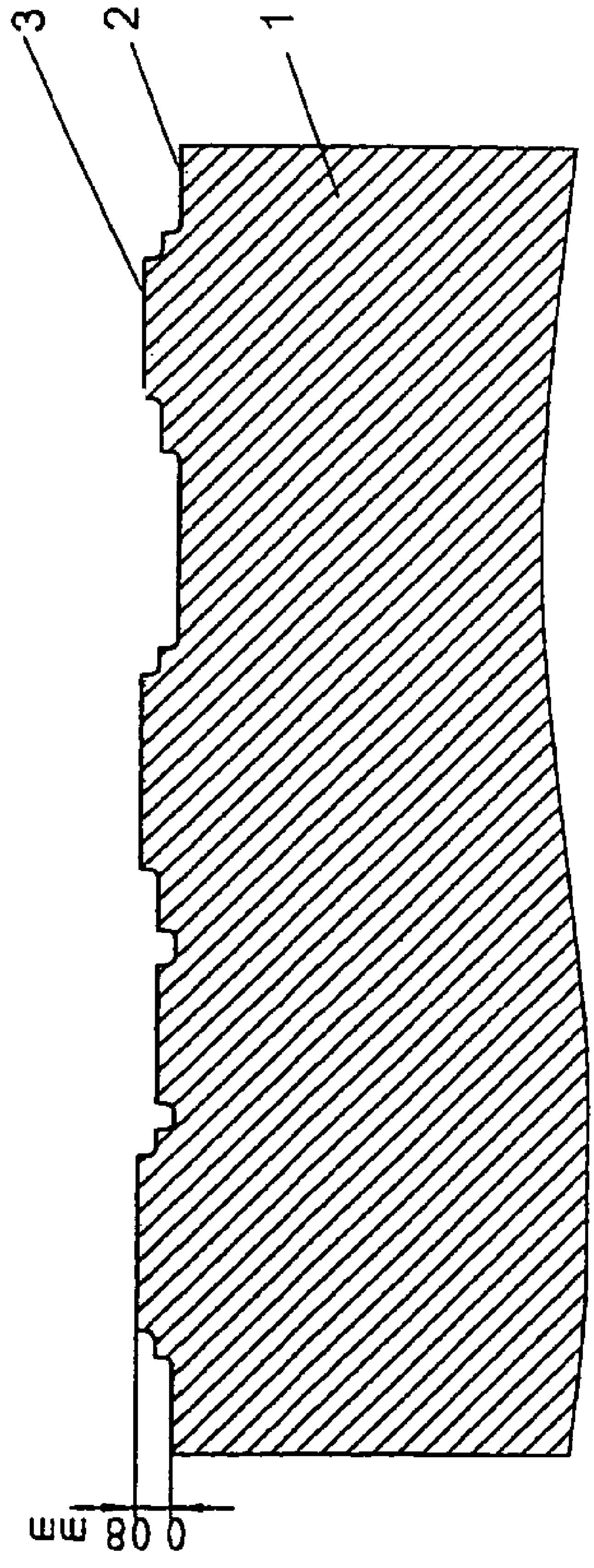
FIG. 2 shows a sectional view along section line A-B.

FIG. 2 shows the cross section along the line of intersection A-B of floor covering 1 of an elastomer material. Height H of unevenly distributed and partially overlapping elevations 3 on surface 2 of floor covering 1 is up to 0.08 mm.

What is claimed is:

1. A floor covering, comprising:

an elastomer material having a textured surface including a plurality of unevenly distributed elevations, wherein each of the plurality of elevations partially overlap one another and have a rectangular shape with rounded corners, and wherein the elevations have edge lengths of between 1.2 mm and 6 mm and heights of between 0.01 mm and 0.1 mm.

2. The floor covering as recited in claim 1, wherein the edge lengths are between 1.3 and 3.6 mm, and the heights are between 0.02 and 0.05 mm.

3. The floor covering as recited in claim 1, wherein each of the pluality of elevations is overlapped by not more than two other of the plurality of elevations.

4. The floor covering as recited in claim 1, wherein the rectangular shapes of the elevations vary.

5. The floor covering as recited in claim 1, wherein the heights of the elevations conform to one another.

6. The floor covering as recited in claim 1, wherein the edge lengths vary.

7. The floor covering as recited in claim 1, wherein the elastomer material is made up of individual, repeating surface area units.

8. The floor covering as recited in claim 1, wherein the elastomer material is a single-layer material.

9. The floor covering as recited in claim 1, wherein the elastomer material has a thickness of 2 mm to 5 mm.

10. The floor covering as recited in claim 1, wherein the elastomer material has a thickness of 2.5 mm to 4 mm.

* * * * *